Figure 1:
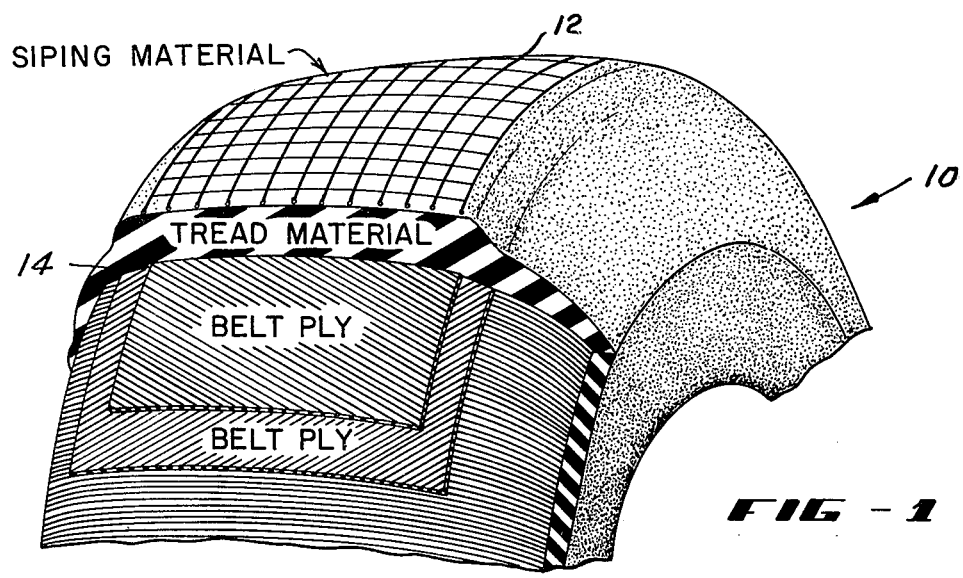

United States Patent [19]

Skidmore

[11] 4,040,464
[45] Aug. 9, 1977

[54] PNEUMATIC TIRE AND METHOD OF MAKING SAME

[76] Inventor: Frank Oren Skidmore, 2513 Third St., Cuyahoga Falls, Ohio 44221

[21] Appl. No.: 645,992

[22] Filed: Jan. 2, 1976

[51] Int. Cl.² .............................................. B60C 9/22
[52] U.S. Cl. ........................ 152/361 R; 152/209 R; 156/128 R
[58] Field of Search .................. 152/209 R, 354–359, 152/361, 209; 156/114, 128, 96, 129, 130, 128 R

[56] References Cited

U.S. PATENT DOCUMENTS

| | | | |
|---|---|---|---|
| 1,372,887 | 3/1921 | Lardos | 152/185 |
| 2,939,502 | 6/1960 | Hindin et al. | 152/361 R |
| 2,962,072 | 11/1960 | Skidmore | 152/209 R |
| 3,563,295 | 2/1971 | Hough | 152/361 R |

Primary Examiner—Drayton E. Hoffman
Attorney, Agent, or Firm—Oldham & Oldham Co.

[57] ABSTRACT

The invention relates to the use of longitudinally extending reinforcing cords associated with the pneumatic tire to control radial force variations in the tire under loaded conditions, and the method for applying such longitudinal reinforcing cords to the tire either in its new form, or as a retreaded tire from an old carcass. Basically, the longitudinal cords are made from a very high strength cord material having a tensile strength of approximately 125 pounds each, with the cords spaced at approximately ½-inch spacings. The cords could be increased to 150 or more pounds each. There will be between about 8 to about 20 cords, depending upon the width of the tread area of the tire involved. This type of construction serves as an extra belt of many hundred pounds tensile strength, thereby controlling radial force variations in the tires, and is particularly applicable to controlling these forces in radial tires.

8 Claims, 4 Drawing Figures

PNEUMATIC TIRE AND METHOD OF MAKING SAME

BACKGROUND OF THE INVENTION

Heretofore, it has been known to produce normal bias ply and radial tires with fabric or steel belts incorporated therein, which belts are designed to make the tread run flatter and give better road contact, and which belts also are alleged to increase the overall life wearing characteristics of the tire.

However, these belts are always of bias ply type construction, and therefore do not completely control radial force variations in the tire, which force variations lead to a bumpy and uneven ride in the vehicle upon which the tire is mounted. Force variations have become an increasing problem in radial tires because of the construction thereof, and further because these tires have a larger overall footprint configuration where the tire meets the road, and hence tend to have more susceptibility to radial force variations. It is further believed more difficult to control the exact true circumferential nature of the radial tires, and it is this factor which I believe leads to the increased difficulty with such force variations in radial tires.

OBJECTS OF THE INVENTION

Based on the above, then, it is general object of my invention to achieve an improvement in radial force variation characteristics of pneumatic tires, and particularly adaptable to radial tires, by the provisions of longitudinally extending reinforcing cords being included in the final cure process of the two stage construction of radial tires to maintain a great longitudinal tensile strength at the circumference of the tire, therefore improving force variations.

It is further an object of my invention to provide this tensile strengthening cord arrangement in an economical and efficient fashion for new and recapped tires.

It is a further object of my invention to incorporate, in conjunction with the force variation control cords, the added feature of providing a tread design having a plurality of individual rubber buttons, thereby acting as an extremely good traction device for snow, ice, or wet road conditions, and in addition providing side skid protection by the longitudinal sipes.

It is a further object of my invention to provide that the longitudinally extending cords be attached to the tire before cure by adhesive means, thereby simplifying the attachment, and ensuring that the cords remain in the proper position during the cure operation.

The foregoing and other objects of my invention which will be better understood in the following detailed description are achieved by providing a pneumatic tire having a tread; a carcass; a strip of scrim positioned near the base of the tread over the full circumference thereof, and at a depth about equal to the depth of the tread design, and of a width about equal to the width of the tread; the scrim being formed of longitudinal cords extending around the full circumference of the tire, each cord having a tensile strength of about 125 pounds, said longitudinal cords being in substantially parallel relation to adjacent cords and spaced in close relationship across the width of the tire; the tread of the tire being formed of a plurality of buttons, each having a cross-sectional shape substantially of the shape of the openings through the scrim, with each button extending through an opening in the scrim and connected to the carcass to hold the scrim and the longitudinal cords in position with respect to the tire.

Figure 2:
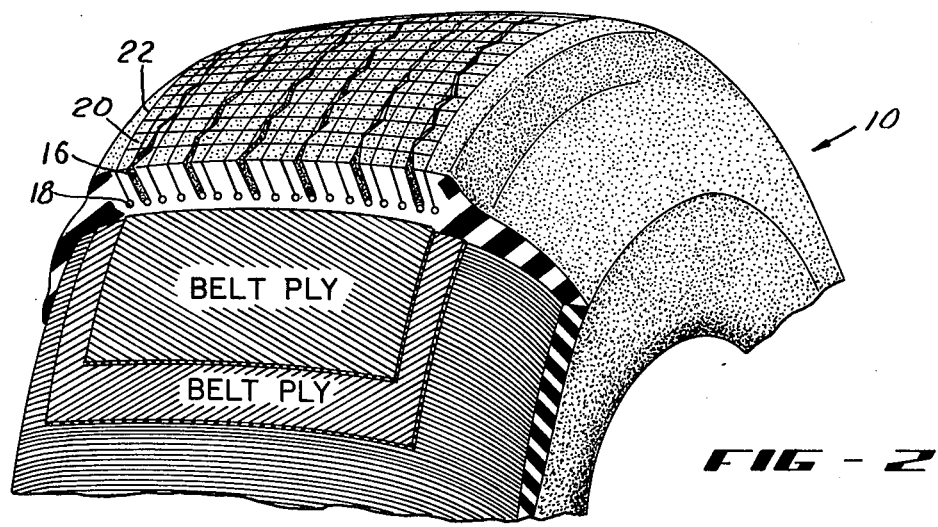
Figure 3:
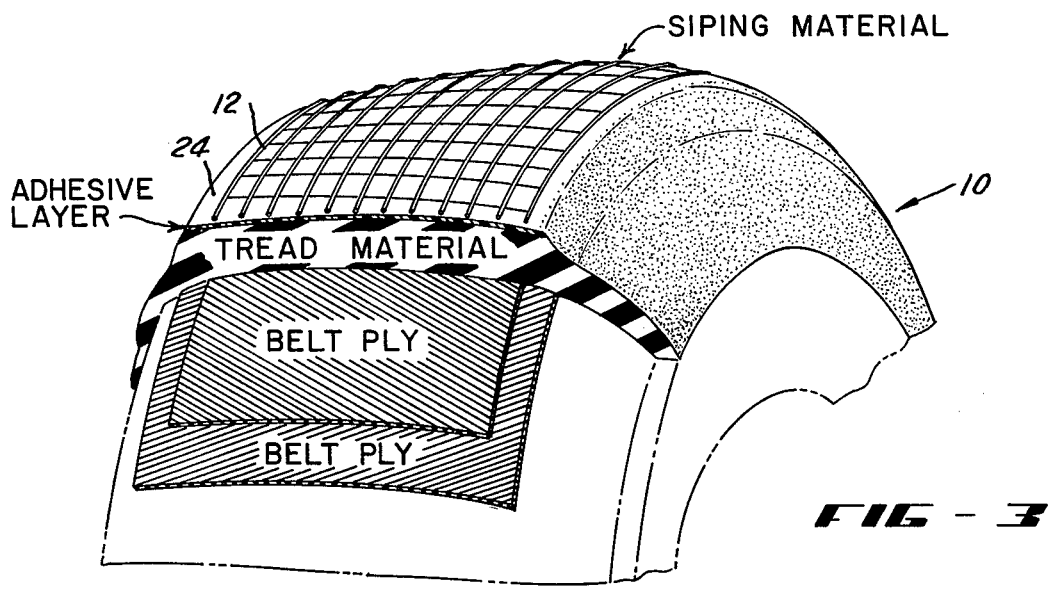
Figure 4:
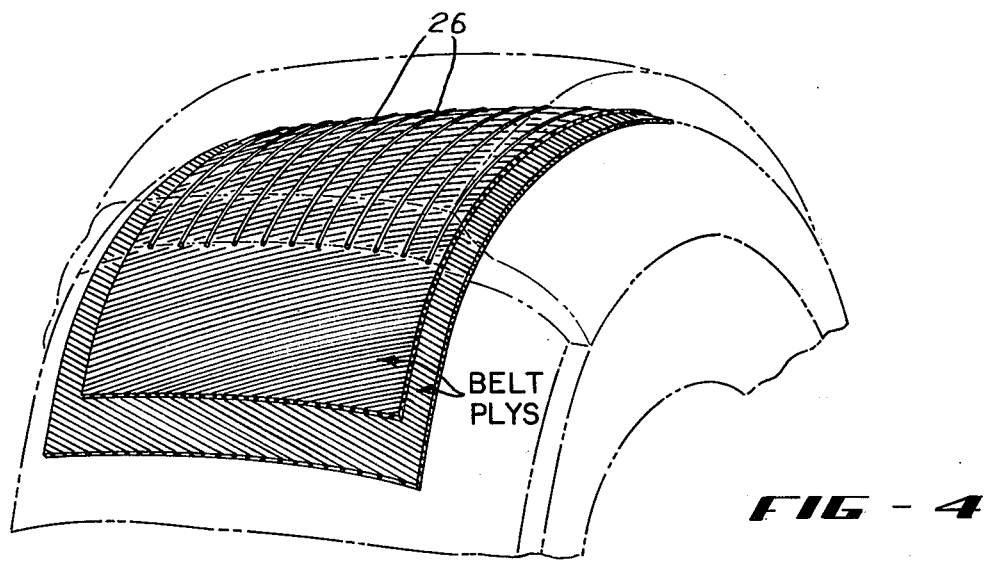

For a better understanding of the invention, reference should be made to the accompanying drawings wherein:

FIG. 1 is a fragmentary, broken-away, 3-dimensional view of a pneumatic tire 10 with the scrim or siping material 12 to achieve the longitudinal reinforcing cords positioned over the tread 14 prior to the molded cure of the tire and the formation of the tread design;

FIG. 2 is a fragmentary, broken-away, 3-dimensional view of the pneumatic tire of FIG. 1, but having been cured in the mold so as to cause the formation of a pattern 16, and wherein the longitudinally supporting cords 18 are appropriately positioned and extending to the greatest depth of the mold design. The buttons 20, while being separated to the full tread depth, nevertheless give a solid appearance to the tread design since the displacement of stock between them is relatively narrow and is shown merely as a line 22. The buttons 20 ride almost shoulder-to-shoulder and give the appearance of having been cut or slit with a knife;

FIG. 3 is a cross-sectional configuration similar to FIG. 2, but showing the tire 10 before it is cured with the scrim 12 attached by an adhesive layer 24 to the outer circumference of the green tire, illustrating how the scrim is held in position prior to tire tread cure; and FIG. 4 is a fragmentary, 3-dimensional, cross-sectional view of an uncured tire showing the positioning of longitudinal strengthening cords 26 only to the exterior circumference of the tire over the belt ply, and before the tire tread material is added. This embodiment really adds a strengthening belt, as these cords will be wound around the tire and preferably adhesively held in position, which position they will retain upon addition of the tread and tire cure. Preferably with this additional belt layer I also will add the scrim or siping material to the outside circumference of the tread prior to cure, so that after cure, in effect, two belts of longitudinally extending strengthening cords are provided, with the outer scrim only having the tread stock forced up through it to form the buttons upon cure.

In order for the scrim to provide the tire tread configuration illustrated in the drawings, or in other words to form the appearance of the cuts or slits to define the buttons, the scrim material must have a lubricant on it that maintains the separation of the rubber stock as it is forced down into the tread during the molding operation, and this technique and process are taught in my own prior U.S. Pat. No. 2,962,072.

An essential feature to achieve the objects of the invention, however, is in the longitudinal cords, so clearly illustrated in FIG. 2 of the drawings, which extend around the full circumference of the tire in parallel relationship to each other. I have found that a very suitable material for these longitudinal cords is a fiber called "Kevlar", as made by the E.I. Du Pont de Nemours & Company, Inc., of Wilmington, Del., which is a material having a very low elongation characteristic and yet very high tensile strength that can be varied anywhere from say, a low of 75 pounds, to a high of 150 pounds or more. These longitudinally extending cords are bonded or secured at all intersections to the laterally or radially extending weft cords to prevent the scrim or siping material from separation at the point where it meets or joins with the tire tread. Any suitable weave of the longitudinal cords and the weft cords will accomplish this feature, or if a synthetic fiber cord is utilized, a chemical bond could also be utilized at these intersections. It is important that the cords have the property of not stretching when under tensile load so as to achieve the reduction in radial force variations in the finished tire.

I have found that for a conventional passenger tire, and particularly a radial type passenger tire, from 8 to 20 longitudinal cords in parallel relation to each other will form an extra belt of many hundred pounds tensile strength, thereby greatly eliminating radial tire force variations in radial tires particularly, but this is applicable to conventional tires as well.

In addition, it can be understood that with the formation of the lateral or radial sipes or slits, and the formation of the buttons, much better traction of the tire is provided for wet or slippery surfaces. The slits at the same time provide channels for lateral movement of water from beneath the footprint of the tire. In addition, it is believed that the tire runs cooler by reducing the rigidity of the tire at the footprint, as these slits will tend to open up, thereby additionally providing ventilation and hence a cooling of the tire during running conditions. Further, the circumferential or longitudinal slits add to the stabilization and prevent lateral skidding of the tire.

This type of scrim or siping material can be used in snow treads as well as conventional treads. Of course, the fact that the scrim or siping material is sunk by the mold to the full depth of the tread configuration effectively implants it into the tire until the tread is worn down to this extra belt. Therefore, no adhesive means or other means are necessary to actually hold the longitudinal cords in place and, because of the lateral running cords being joined to the longitudinal cords at all intersections, the longitudinal cords do, in fact, provide the longitudinally running belt that controls force variations in the tire, which also substantially distinguishes it from the bias type belts known and used heretofore.

Since in all tire molding operations of which I am aware the rubber is actually forced up into the mold configuration for the tread design, if the scrim layer is placed over the green tire or the retreaded carcass, as illustrated in FIG. 1, the rubber will be forced up through the scrim configuration thereby holding the scrim at the bottom of the tread design and, in effect, not allowing any circumferential expansion of the scrim during the curing operation. Hence, if the ends of the longitudinal cords are placed in end-to-end registration after they are wrapped longitudinally around the tire, they will remain in that position during the cure, and the excellent longitudinal belt of high tensile strength will be accurately formed in relation to the tread depth of the tire.

I have found, however, that it is advisable in many instances to utilize an adhesive layer between the scrim layer and the rubber tire carcass, this adhesive layer perhaps preferably being a pressure-sensitive adhesive which is incompatible to the rubber during the cure operation, thereby providing the lubricant called for in my prior patent. In addition, I have found that if I spray or paint on a coating of noncompatible adhesive over the tread surface to form a tacky coat, then the scrim can be easily positioned and retained to the tire by the tacky surface coat.

Therefore, it is seen that the objects of the invention are achieved by providing circumferentially extending cords having a tensile strength sufficient to provide, in effect, an extra belt, thereby controlling radial force variations during the operation of a pneumatic tire, and particularly a radial type tire. In addition, greater traction is achieved by providing the laterally extending cords to hold the longitudinal cords in position, and to thereby provide a number of slits in the tread configuration.

While in accordance with the patent statutes only a preferred embodiment of the invention has been illustrated and described in detail, it is to be particularly understood that the invention is not limited thereto or thereby, but that the inventive concept is defined in the appended claims.

What is claimed is:

1. A pneumatic tire having a tread layer having a tread design, a carcass, a strip of siping material positioned in the tread layer over the full circumference thereof and at a depth about equal to the depth of the tread design and across a substantial width of the tread, which is characterized by the siping material including longitudinally extending cords which extend in longitudinal, substantially parallel relationship around the full circumference of the tire, said cords having great tensile strength, and being subject to minimum elongation within their designed tensile strength, said cords acting in conjunction with the tread layer to form a belt ply to reduce radial force variations in the tire under operating conditions, wherein the longitudinal cords have a tensile strength of between about 75 to about 150 pounds, and there are between about 8 to about 20 cords across the width of the tread.

2. A pneumatic tire according to claim 1 wherein the siping material consists of longitudinal cords and laterally extending weft cords having interlocked intersections with the longitudinal cords at about a 90° relationship thereto, said weft cords locking the longitudinal cords into position at about the depth of the tread design.

3. A pneumatic tire according to claim 2 wherein the weft cords of the siping material form laterally extending cuts into the tread design which allows for greater tire traction, ventilation, and water dissipation at the footprint of the tire during operation.

4. A pneumatic tire according to claim 2 which includes at least one bias belt between the tire carcass and the tread which is further characterized by including a plurality of longitudinally extending cords between the tread and the bias belt.

5. A pneumatic tire according to claim 4 wherein the longitudinal cords are in end-to-end registration after they are wrapped longitudinally around the tire.

6. A method of making a pneumatic tire which includes the steps of attaching a siping material by an adhesive that is incompatible with rubber to the outside circumference of the tire in an uncured condition, forcing the siping material radially inwardly into the tread layer of the tire during the vulcanization of the tire to the depth of the tread design to create longitudinal and lateral cuts in the tread surface, which is characterized by the siping material having a plurality of longitudinally extending cords of tensile strength between 75 to 150 pounds with minimum elongation within their designed tensile strength that, when positioned at the depth of the tread design, establish circumferentially extending substantially parallel cords acting in conjunction with the tread layer as a belt ply to control radial force variations in the tire, and completing the vulcanization of the tire to form the regular tread design on the tire.

7. A method of making a pneumatic tire according to claim 6 wherein the adhesive is a pressure sensitive adhesive that is carried on the siping material and which allows the siping material to be applied to the outer circumference of the tire prior to cure and held in position within the tread layer of the tire during the cure, and which pressure sensitive adhesive is incompatible with rubber.

8. A method of making a pneumatic tire according to claim 6 which includes the step of coating the external portion of the tire tread with an adhesive incompatible with rubber to create a tacky face surface and positioning the siping material onto the tacky surface to hold it in place prior to placing the tire into the mold and effecting curing of the same and formation of the tread design.

* * * * *